United States Patent Office 2,866,471
Patented Dec. 30, 1958

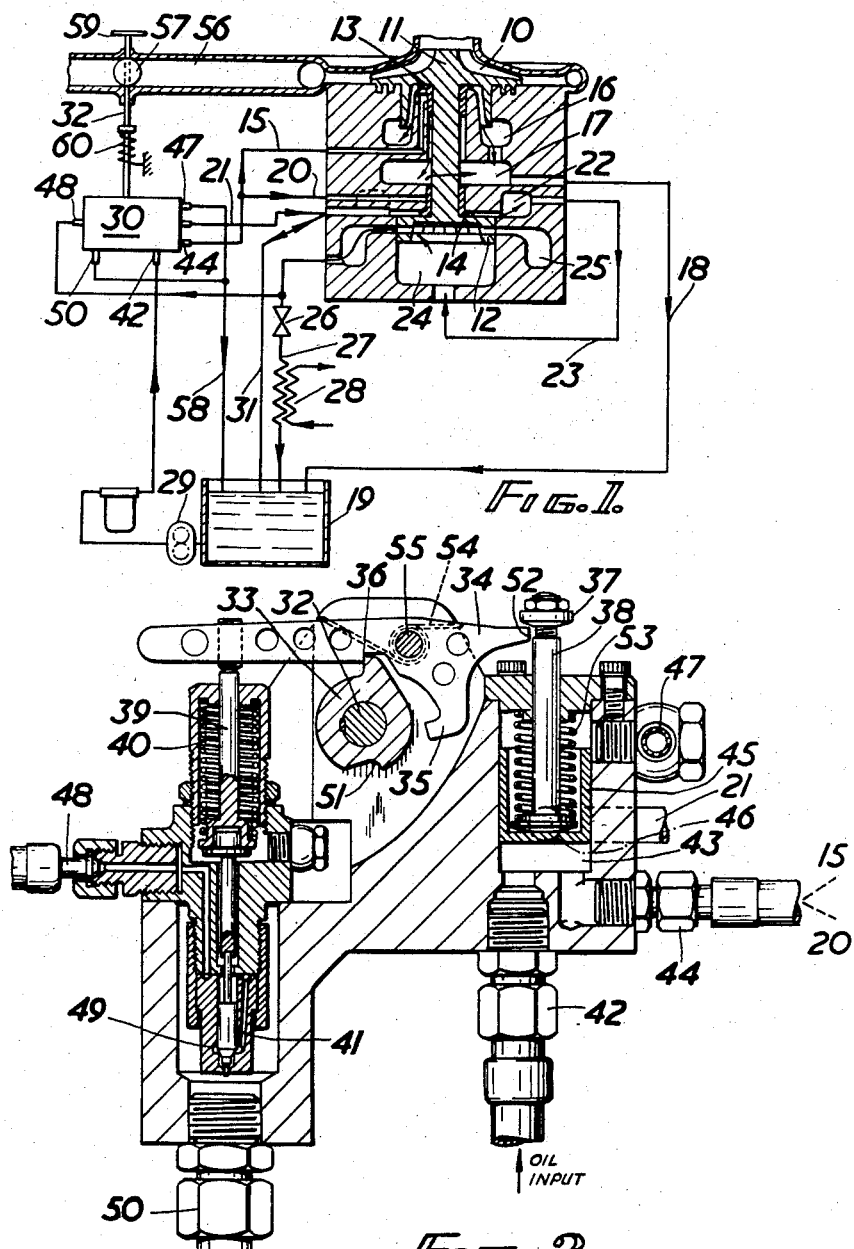

2,866,471

CONTROL ARRANGEMENTS FOR ROTARY MACHINES

John Constantine Grey, Isleworth, England, assignor to Power Jets (Research & Development) Limited, London, England, a British company Application July 6, 1953, Serial No. 366,250

Claims priority, application Great Britain July 22, 1952

2 Claims. (Cl. 137—28)

This invention relates to control arrangements for rotary machines.

It is common practice for rotary machines to be equipped with a pressurised lubricating oil supply and it has been previously proposed to incorporate hydraulic braking in the form of an impeller through which hydraulic fluid is forced to flow. In any machinery it is necessary that lubricating oil pressure shall be at a satisfactory level before the machinery is placed in operation and where there is a hydraulic brake of the form mentioned it is necessary that the brake should be maintained in primed condition throughout the operation of the machine.

The present invention provides a control arrangement for a rotary machine comprising means for producing a fluid pressure substantially proportional to the rotational speed of that machinery and an overspeed trip device responsive to said fluid pressure and operable upon a predetermined pressure being attained to prevent overspeeding.

The control effected by said fluid pressure may expand to speed governing. It is preferred that lubricating oil should be the fluid used for producing e. g. by a centrifugal pump the speed indicating pressure. The control may also prevent operation of the machine unless the full lubrication supply pressure is built up and the pump is primed.

The invention also provides an arrangement for controlling fluid flow through a rotary machine comprising a duct leading said fluid to said machine, a throttle in said duct, a centrifugal pump driven by said machine, means for delivering oil to said pump after it has lubricated said machine, a spring loaded trigger valve connected to the output of said pump and arranged to operate at a predetermined delivery pressure thereof and a connection between said valve and said throttle for shutting the latter upon operation of the former.

The arrangement is conveniently applied to an inward flow turbine by placing a butterfly valve as the throttle in the inlet duct leading to a scroll casing of the turbine.

The invention will now be described, by way of example only, with reference to a radial flow turbine control embodiment thereof as shown in the accompanying drawings in which:

Figure 1 is a diagram showing a turbine wheel on whose shaft an oil impeller pump is carried and a combined oil lubricating and braking system.

Figure 2 is a section through a mechanism for preventing the operation of the turbine when the lubricating oil supply pressure is too low or the oil pump output pressure is too high.

The rotary machine will be seen in Figure 1 to comprise a turbine 10 mounted upon a shaft 11 at the opposite end of which there is an impeller 12 through which oil is forced to flow and which acts as a pump or brake. The turbine shaft runs in an inboard bearing 13 and an outboard bearing 14. Lubricating oil is supplied by the pipe line indicated at 15 to the inboard bearing and returned oil from this bearing is collected in the cavities 16 and 17, surrounding the shaft 11. A pipe line 18 takes the returned oil from this bearing to the sump 19. Oil is supplied via the pipe 20 to the outboard bearing and some of the oil from this bearing is also returned via the cavity 17 and the pipe line 18 to the sump 19. There is a cavity 22 provided for collecting the oil from the thrust face of this bearing. Oil from the cavity 22 is fed in series via the branch 23 through the intake 24 of the oil brake impeller 12. Oil from this impeller is collected under pressure in the cavity 25 and it is returned via a needle restrictor 26 and the pipe line 27 to the sump 19. The needle restrictor can serve to adjust the oil flow and hence by altering the outlet pressure from the brake impeller the speed of the machine. An oil cooler 28 may conveniently be inserted into its return path.

The output of the lubricating oil supply pump 29 is selected to be half of the output of the brake impeller 12. A small proportion of the supply pump output is led via the valve and control mechanism 30 to the bearing oil supply lines 15 and 20. The remainder is led via a branch 21 past the thrust face of the bearing 14 and from there to the brake impeller as explained above. This series arrangement ensures that the cavity 22 is continually scavenged by cool oil. In addition to the pipe lines already mentioned another indicated at 31 connects the oil intake to the outboard bearing thrust face to the sump 19.

The operation of the system, assuming that the whole circuit has been completely drained of oil, is as follows:

On starting the oil supply pump the two bearings are immediately oil pressurised and the cavity 22 flooded with the excess oil from the pump. As this cavity fills with oil it expels the air ahead of it via branch 23, then proceeds to fill the intake cavity 24 and the delivery cavity 25, after which the oil reaches the restrictor valve 26. The bulk of the excess oil from the lubricating oil supply pump then returns to the sump via branch 31.

With the oil system primed the turbine may safely be started. It will be seen that the pipe line 31 may operate either as a suction or as a drain, depending on the oil flow from the brake. If the latter is in excess of the by-pass flow delivered through the branch pipe 21 by the oil pump, then the difference will be drawn up from the sump via branch 31. If not, then the difference will be returned.

As the pressure of the oil delivered by the brake is approximately a function of the rotational speed of the machine, it is possible to use a simple overspeed trip responsive to the brake output pressure.

The operation of such a trip is explained below with reference to Figures 1 and 2 together. There is also a device shown for preventing the operation of the machine before the lubricating oil pressure has reached a high enough value. This device and the overspeed trip unit are integrated with the starting arrangement for the turbine in one mechanism shown at 30 in Figure 1 and forming the subject of Figure 2. The turbine duct 56 incorporates a butterfly valve 57 which, when closed, prevents the passage of working fluid and therefore the turbine from running. The shaft by means of which the butterfly valve in the turbine duct is controlled is shown at 32. Keyed on to this shaft there is a collar 33 (Figure 2) which has a cam surface. Co-operating with this cam surface there is a lever 34 which has a projection 35 and a detent 36 co-operable respectively with corresponding parts of the collar 33. At one end the lever 34 engages with a ring 37 at the top of a spring loaded valve shaft 38. The other end of the lever 34 co-acts with the end of a spindle 39 which is spring loaded by the spring 40 and is responsive to the differentially operated oil valve 41.

Oil fed from the supply pump 29 (Figure 1) enters the mechanism 30 shown in Figure 2 via the union 42. It passes through the bottom of the valve chamber 43 out to the rotary machine by way of the union 44. The pressure built up in this oil supply is applied to the face of the spring loaded piston 45 and as the pressure increases so that piston is raised. As it rises it uncovers the port 46 which allows spill oil to flow via branch 21 to the brake. Any oil which leaks past the piston 45 is removed via the outlet 47.

Oil under pressure from the brake impeller is received by the mechanism shown in Figure 2 via the union 48 and it passes to the chamber 49 at the lower end of the differentially operable oil valve 41. This valve, which is commercially obtainable, is normally seated and very little oil passes out through the drain 50. At a pressure dependent upon the loading of the spring 40 the valve rises off its seating, a greater area of the valve is then presented to the oil pressure and the valve spindle rises abruptly. The rate of the spring 40 is adjusted to promote this movement.

The outlet 47 and drain 50 have a common pipe connection 58 back to the sump.

The operation of the mechanism, assuming that the machine is initially substantially free from oil, is as follows:

As no oil pressure is operating upon the face of the piston 45 that piston with the spindle 38 is at its lowest position. Similarly, the differential valve 41 is un-operated. The closed position of the butterfly valve 57 in the turbine duct 56 is arranged so that the projection 35 on the lever 34 is engaged with the detent 51 on the collar 33. The ring 37 engaging with the lever 34 at its end 52 locks the projection 35 in the detent 51. It is therefore impossible to open the butterfly throttle valve and to start the turbine without first releasing the interengagement of the ring and the lever. The only action that can be taken is to start up the oil supply pump. Oil then begins to flow through the mechanism via the unions 42, 44 and gradually the pressure is built up in the chamber 43. The piston 45 is raised against the pressure of the spring 53 and as the spindle 38 rises the ring 37 disengages from the lever 34. The turbine butterfly valve may now be opened by the handwheel 59 and the collar 33 is rotated into the position shown in the figure. A biasing spring 54 causes the lever to pivot about its mounting 55 so that the projection on the collar 33 engages with the detent 36 in the lever 34. This interengagement holds the butterfly valve open against the spring pressure exerted on the shaft 32 by a spring 60. It will be appreciated that failure of the oil supply pressure will cause the spring 53 to push down the piston 45 and the interaction between the ring 37 and the end 52 of the lever 34 would release the collar from the detent 36 so shutting the butterfly valve and stopping the machine.

The release of the projection on the collar 33 from the detent 36 is also brought about when the brake oil pressure rises beyond a pre-determined limit imposed by the spring 40. In that case, the differential valve 41 rises and causes the lever 34 to be disengaged from the collar 33 and this also shuts the butterfly valve. As has been previously indicated, the oil pressure at the output from the brake is approximately a function of the speed of the machine, so that the differential valve 41 operates as an overspeed trip preventing the turbine 10 (Figure 1) from running away.

It will be seen that the starting mechanism for the machine, which is shown in Figure 2, provides in one integrated unit 30 the device for preventing the continuance in operation of the machine above a predetermined rotational speed together with the means for ensuring that the lubrication oil pressure is maintained at its proper value and that the priming of the oil brake is complete. Those skilled in the art will understand that although the oil pressure provided by the impeller pump is here utilised only for the overspeed trigger action it can also be employed for continuous speed governing. In the particular example quoted above the supply of working fluid to the turbine could be closely governed by the interaction of a response to the oil pressure generated by the machine-driven pump and the throttle position.

It may not always be convenient to use lubricating oil as the fluid by means of which control is effected and an air pump, for example, can easily be envisaged as forming the basis of one alternative embodiment of the invention.

What I claim is:

1. A control arrangement for rotary machinery having an independently driven pump to supply fluid to a lubrication system thereof comprising means for producing a fluid pressure substantially proportional to the rotational speed of said machinery, a trip device responsive to said fluid pressure at a pre-determined level, a pressure responsive device directly and continually influenced by pressure created within said lubrication system by said independently driven pump, valve means to control a supply of working fluid to said machinery, an operative connection between said valve means on one hand and said trip device and said pressure responsive device on the other both to prevent overspeeding of said machinery and to shut down said machinery in the event of failure of said lubrication system, and a positive locking device forming part of said operative connection and operable by said pressure responsive device and arranged to control said valve means to prevent the starting of said rotary machinery until said lubrication system has been pressurized by said independently driven pump.

2. A control arrangement for high speed machinery having an independently driven pump to supply fluid to lubricate the bearings of the machinery, comprising means receiving fluid discharged from the bearings for producing a fluid pressure substantially proportional to the rotational speed of said machinery, a trip device responsive to an increase of said fluid pressure to a predetermined level, a pressure responsive device directly and continuously influenced solely by pressure created by said independently driven pump, valve means to control a supply of working fluid to said machinery, an operative connection between said valve means on one hand and said trip device and said pressure responsive device on the other hand both to prevent overspeeding of said machinery and to shut down said machinery in the event of failure of the lubrication system.

References Cited in the file of this patent

UNITED STATES PATENTS

| | | |
|---|---|---|
| 1,816,020 | Meyer | July 28, 1931 |
| 2,126,533 | Caughey | Aug. 9, 1938 |
| 2,146,278 | Woodward | Feb. 7, 1939 |
| 2,497,695 | Sheppard | Feb. 14, 1950 |
| 2,517,501 | Mennesson | Aug. 1, 1950 |
| 2,523,039 | Mayor et al. | Sept. 19, 1950 |

FOREIGN PATENTS

| | | |
|---|---|---|
| 309,602 | Italy | July 11, 1933 |